US010355782B2

(12) United States Patent
Adams et al.

(10) Patent No.: US 10,355,782 B2
(45) Date of Patent: Jul. 16, 2019

(54) MODULAR, WIRELESS OPTICAL ANTENNA

(71) Applicant: 8 Rivers Capital, LLC, Durham, NC (US)

(72) Inventors: Michael W. Adams, Chapel Hill, NC (US); William J. Brown, Durham, NC (US); Dayong Zhou, Brecksville, OH (US); Hannah Clark, Durham, NC (US)

(73) Assignee: 8 RIVERS CAPITAL, LLC, Durham, NC (US)

( * ) Notice: Subject to any disclaimer, the term of this patent is extended or adjusted under 35 U.S.C. 154(b) by 0 days.

(21) Appl. No.: 16/227,115

(22) Filed: Dec. 20, 2018

(65) Prior Publication Data

US 2019/0123827 A1 Apr. 25, 2019

Related U.S. Application Data

(63) Continuation of application No. 15/451,092, filed on Mar. 6, 2017, now Pat. No. 10,187,153.
(Continued)

(51) Int. Cl.
*H04B 10/27* (2013.01)
*H04B 10/114* (2013.01)
(Continued)

(52) U.S. Cl.
CPC ............. *H04B 10/27* (2013.01); *H01Q 5/22* (2015.01); *H04B 10/1129* (2013.01);
(Continued)

(58) Field of Classification Search
CPC ............. H04B 10/27; H04B 10/1149; H04B 10/1143; H04B 10/1129; H04B 10/40; H01Q 5/22; H04W 84/18
(Continued)

(56) References Cited

U.S. PATENT DOCUMENTS

| 4,727,600 A | 2/1988 | Avakian |
| 4,975,926 A | 12/1990 | Knapp |

(Continued)

FOREIGN PATENT DOCUMENTS

| WO | 03103189 A1 | 12/2003 |
| WO | 2012109248 A1 | 8/2012 |
| WO | 2015106110 A1 | 7/2015 |

OTHER PUBLICATIONS

Murat Yuksel et al., "Free-space-optical mobile as hoc networks: Auto-configurable building blocks", Wireless Networks, Apr. 2009, vol. 15, Issue 3.
(Continued)

*Primary Examiner* — Juan A Torres
(74) *Attorney, Agent, or Firm* — Womble Bond Dickinson (US) LLP

(57) ABSTRACT

A modular node for an optical communication network includes one or more transceiver modules of a plurality of transceiver modules, and a node core including a plurality of electrical connectors to electrically join up to the plurality of transceiver modules to the node core. At least some of the transceiver modules has an optical transceiver configured to emit optical beams carrying data and without artificial confinement, and detect optical beams emitted and without artificial confinement. The up to the plurality of transceiver modules electrically joined to the node core are spatially separated to provide configurable coverage for optical communication based on their number and placement. And the node core further includes switching circuitry configured to connect the one or more transceiver modules to implement a redistribution point or a communication endpoint in the optical communication network.

20 Claims, 8 Drawing Sheets

Related U.S. Application Data

(60) Provisional application No. 62/304,680, filed on Mar. 7, 2016.

(51) Int. Cl.
*H04B 10/40* (2013.01)
*H04B 10/112* (2013.01)
*H01Q 5/22* (2015.01)
*H04W 84/18* (2009.01)

(52) U.S. Cl.
CPC ..... *H04B 10/1143* (2013.01); *H04B 10/1149* (2013.01); *H04B 10/40* (2013.01); *H04W 84/18* (2013.01)

(58) Field of Classification Search
USPC .......................................................... 398/135
See application file for complete search history.

(56) References Cited

U.S. PATENT DOCUMENTS

| | | |
|---|---|---|
| 5,159,480 A | 10/1992 | Gordon et al. |
| 5,218,356 A | 6/1993 | Knapp |
| 5,416,627 A | 5/1995 | Wilmoth |
| 5,724,168 A | 3/1998 | Oschmann et al. |
| 5,786,923 A | 7/1998 | Doucet et al. |
| 6,064,502 A | 5/2000 | Burns et al. |
| 6,222,657 B1 | 4/2001 | Fujino et al. |
| 6,323,980 B1 | 11/2001 | Bloom |
| 6,486,994 B1 | 11/2002 | Giles |
| 6,829,439 B1 | 12/2004 | Sidorovich et al. |
| 6,895,253 B1 | 5/2005 | Carloni et al. |
| 6,990,350 B2 | 1/2006 | Davis et al. |
| 8,160,036 B2 | 4/2012 | Smith et al. |
| 8,380,072 B2 | 2/2013 | Wang et al. |
| 8,655,180 B2 | 2/2014 | Vaananen |
| 8,831,524 B2 | 9/2014 | Milner et al. |
| 9,270,372 B2 | 2/2016 | Miniscalco |
| 9,350,448 B2 | 5/2016 | Byers |
| 2001/0043381 A1 | 11/2001 | Green et al. |
| 2002/0181055 A1 | 12/2002 | Christiansen et al. |
| 2004/0218766 A1 | 11/2004 | Angell et al. |
| 2006/0165416 A1 | 7/2006 | Moursund et al. |
| 2013/0010675 A1 | 1/2013 | Huen et al. |
| 2013/0223846 A1 | 8/2013 | Joseph et al. |
| 2013/0315604 A1 | 11/2013 | LoPresti et al. |
| 2014/0248058 A1 | 9/2014 | Simpson et al. |
| 2015/0349881 A1 | 12/2015 | Byers |
| 2016/0294472 A1 | 10/2016 | Palmer et al. |

OTHER PUBLICATIONS

International Search Report for International Application No. PCT/IB2017/051307 dated May 12, 2017.

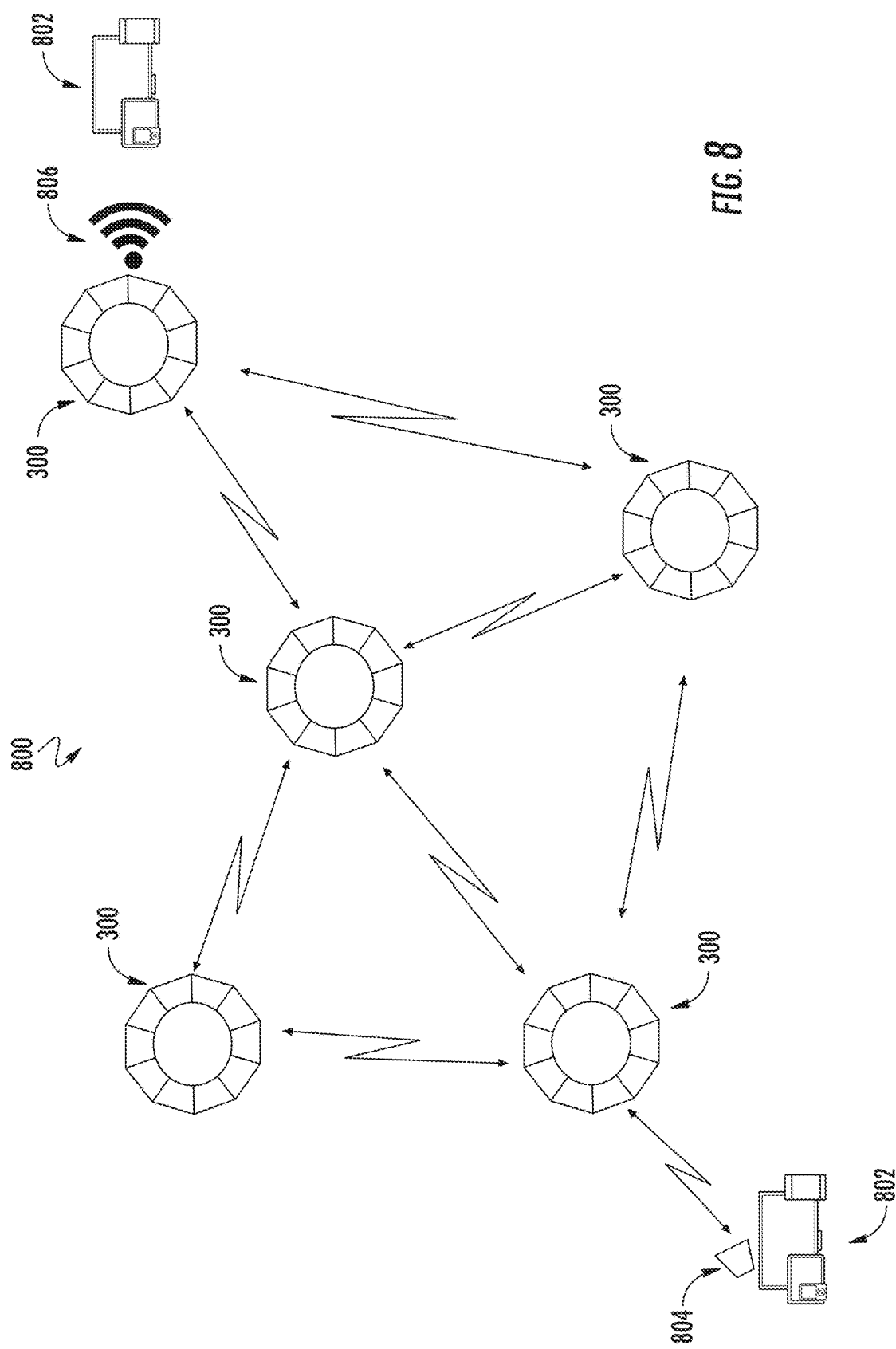

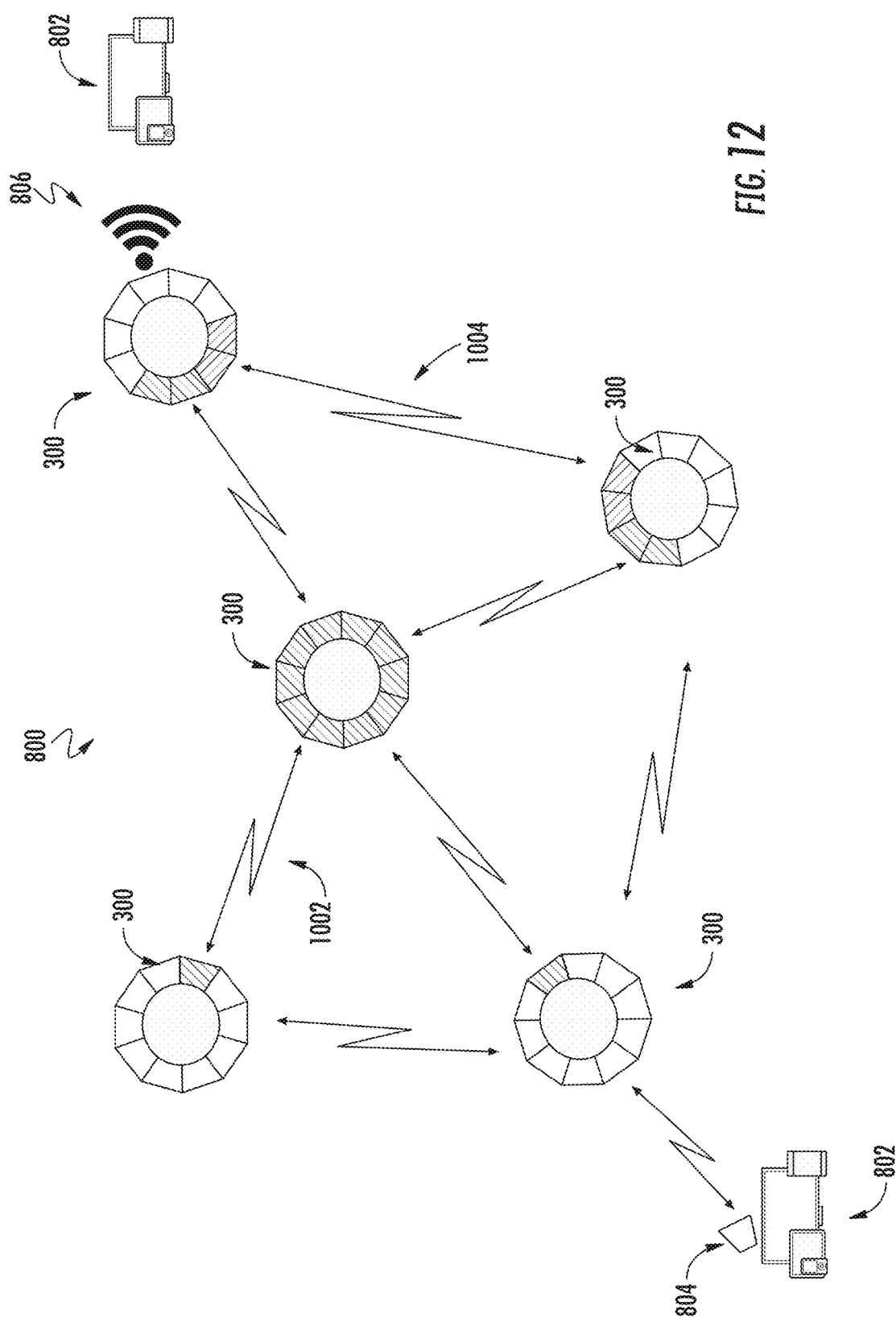

MODULAR, WIRELESS OPTICAL ANTENNA

CROSS-REFERENCE TO RELATED APPLICATION(S)

The present application is a continuation of U.S. patent application Ser. No. 15/451,092, entitled: Modular, Wireless Optical Omni-Antenna, filed on Mar. 6, 2017, and which claims priority to U.S. Provisional Patent Application No. 62/304,680, entitled: Modular, Wireless Optical Omni-Antenna, filed on Mar. 7, 2016, the contents of both of which are incorporated herein by reference in their respective entireties.

TECHNOLOGICAL FIELD

The present disclosure relates generally to optical communications and in particular, diverged-beam optical communications.

BACKGROUND

Optical wireless communications systems today despite providing much higher bandwidth have found only niche applications due to the necessity for line-of-sight operation, high atmospheric attenuation over the wireless channel especially in fog, the high cost of lasers on a per watt basis, and lack of misalignment tolerance necessitating the addition of high-cost pointing and tracking systems. To overcome the misalignment problem, omni-directional optical wireless antennas ("omni-antennas") have been proposed that send and receive optical wireless signals in all directions, including omni-antennas which function in a mobile ad-hoc network (or MANET). Most current omni-antennas are contemplated at low power level often with LEDs for purposes of achieving broad transmitter divergence angles and wide field-of-view receivers. However, such implementations provide only limited ranges and are proposed with components with limited modulation rates which limits throughput and therefore have limited applications, such as indoor local area networks (LANs) or other confined spaces.

Other teachings contemplate 360 degree transmit coverage with mirrors but do not address detector field-of-view. Others provide for devices to have IR transmitter and receiver pairs but contemplate the network as static in a master-slave configuration.

Therefore, it would be desirable to have a system and method that takes into account and resolves at least some of the issues discussed above, as well as possibly other issues.

BRIEF SUMMARY

To solve several of these shortcomings, a high-power, modular, omni-capable node for optical wireless communications is provided. The high-power, diverged beam system of the type proposed in PCT Patent Application Publication No. WO 2015/106110, and its corresponding U.S. patent Application Publication No. 2016/0294472 (both incorporated by reference herein in their respective entireties), is here manifested as a single panel on node, with the composition of multiple panels on one node making it omni-capable. The node is designed to be modular (e.g., handle panels of different specifications depending on the application), support mobility, and, when in the presence of other nodes, function as a mesh network or MANET. The node handles dynamic reconfiguration of the network as nodes move between panel coverage areas. Panels themselves can be of various power levels, of various different emitter sources, various divergence and acceptance angles, and of various modulation rates and schemes. In an omni-directional configuration, the node covers an entire area around the node within the design distance of the module leading to no angular tolerance issues, yielding lower cost solutions to the line of sight problem via inexpensive deployment of multiple nodes combined with the path redundancy of a mesh network, addressing attenuation via high power transmitters and wide field-of-view receivers, and enabling continuous connectivity for mobile nodes moving through the mesh network coverage area.

Example implementations provide a modular wireless communications node with omni-directional capability with one or more higher-power, highly-diverged laser beams with high modulation rates coupled with at least one high acceptance angle receiver, when configured in various forms, supports advanced mesh network functions. This will help address the attenuation, distance, and speed limitation of previous art. In addition, example implementations provide a modular design including a single node and multiple modules (also called panels) which will help reduce cost and enable more frequent and inexpensive deployment of nodes to address the line-of-sight limitations often encountered with free-space optical links.

The present disclosure thus includes, without limitation, the following example implementations:

Some example implementations provide a modular node for an optical communication network, the modular node comprising one or more transceiver modules of a plurality of transceiver modules at least some of which with an optical transceiver configured to emit optical beams carrying data and without artificial confinement, and detect optical beams emitted and without artificial confinement; and a node core including a plurality of electrical connectors to electrically join up to the plurality of transceiver modules to the node core, the up to the plurality of transceiver modules electrically joined to the node core being spatially separated to provide configurable coverage for optical communication based on their number and placement, wherein the node core further includes switching circuitry configured to connect the one or more transceiver modules to implement a redistribution point or a communication endpoint in the optical communication network.

In some example implementations of the modular node of any preceding or any subsequent example implementation, or any combination thereof, the optical transceiver is configured to emit optical beams, and detect optical beams emitted, with a divergence angle greater than 0.1 degrees, and with a photonic efficiency of less than 0.05%, the photonic efficiency relating a number of detectable photons to a number of emitted photons of the optical beams.

In some example implementations of the modular node of any preceding or any subsequent example implementation, or any combination thereof, the one or more transceiver modules include optical transceivers with different specifications in terms of a nominal angle, datarate or distance.

In some example implementations of the modular node of any preceding or any subsequent example implementation, or any combination thereof, the one or more transceiver modules include transceiver modules having respective fields of view that at least partially overlap and thereby define an area covered by the transceiver modules when joined to the node core, and each of the transceiver modules supports communication to one or more transceiver modules of one or more other modular nodes in its field of view through time-division or wavelength division multiplexing, and wherein the switching circuitry is further configured to dynamically select between the transceiver modules to provide coverage for the area covered by both or all of the transceiver modules.

In some example implementations of the modular node of any preceding or any subsequent example implementation, or any combination thereof, at least one of the one or more transceiver modules joined to the node core spans more than one of the plurality of electrical connectors.

In some example implementations of the modular node of any preceding or any subsequent example implementation, or any combination thereof, at least some of the one or more transceiver modules joined to the node core further has active tracking implemented by mechanical movement, beam steering or liquid lens.

In some example implementations of the modular node of any preceding or any subsequent example implementation, or any combination thereof, at least some of the one or more transceiver modules joined to the node core further has a processor configured to control the transceiver module or facilitate communications between two or more of the transceiver modules through the node core.

In some example implementations of the modular node of any preceding or any subsequent example implementation, or any combination thereof, the processor and logic are further configured to ignore, block or filter optical beams intended for an adjacent transceiver module joined to the node core, or modify its orientation, power level or frequency of its optical transceiver based on activity of the adjacent transceiver module.

In some example implementations of the modular node of any preceding or any subsequent example implementation, or any combination thereof, the one or more transceiver modules include a transceiver module with an optical transceiver configured to emit and detect optical beams carrying data, and another transceiver module with an electromagnetic wave transceiver configured to transmit and receive electromagnetic waves carrying data and in a band in the range of 1 megahertz (MHz) to 10 terahertz (THz).

In some example implementations of the modular node of any preceding or any subsequent example implementation, or any combination thereof, the node core further has a processor and logic configured to ignore, block or filter optical beams from one or more of the transceiver modules joined to the node core, or modify an orientation, power level or frequency of one or more of the transceiver modules joined to the node core.

In some example implementations of the modular node of any preceding or any subsequent example implementation, or any combination thereof, the node core further includes a network connection to link the modular node to another network that is distinct from the optical communication network.

In some example implementations of the modular node of any preceding or any subsequent example implementation, or any combination thereof, the switching circuitry being configured to connect the one or more transceiver modules includes being configured to switchably connect the one or more transceiver modules to support a mesh or mobile ad-hoc network topology of the optical communication network that includes the modular node and one or more other modular nodes with which the modular node is configured to communicate.

Some example implementations provide a method of implementing a redistribution point or a communication endpoint in an optical communication network, the method comprising electrically joining one or more up to a plurality of transceiver modules to a node core, at least some of the plurality of transceiver modules with an optical transceiver configured to emit optical beams carrying data and without artificial confinement, and detect optical beams emitted and without artificial confinement, the node core having a plurality of electrical connectors for electrically joining up to the plurality of transceiver modules, the up to the plurality of transceiver modules electrically joined to the node core being spatially separated to provide configurable coverage for optical communication based on their number and placement; and connecting, by switching circuitry of the node core, the one or more transceiver modules to implement the redistribution point or the communication endpoint in the optical communication network.

In some example implementations of the method of any preceding or any subsequent example implementation, or any combination thereof, the optical transceiver is configured to emit optical beams, and detect optical beams emitted, with a divergence angle greater than 0.1 degrees, and with a photonic efficiency of less than 0.05%, the photonic efficiency relating a number of detectable photons to a number of emitted photons of the optical beams.

In some example implementations of the method of any preceding or any subsequent example implementation, or any combination thereof, electrically joining the one or more transceiver modules comprises electrically joining one or more transceiver modules including optical transceivers with different specifications in terms of a nominal angle, datarate or distance.

In some example implementations of the method of any preceding or any subsequent example implementation, or any combination thereof, electrically joining the one or more transceiver modules comprises electrically joining one or more transceiver modules having respective fields of view that at least partially overlap and thereby define an area covered by the transceiver modules when joined to the node core, and each of the transceiver modules supports communication to one or more transceiver modules of one or more other modular nodes in its field of view through time-division or wavelength division multiplexing, and wherein connecting the one or more transceiver modules further comprises dynamically selecting between the transceiver modules to provide coverage for the area covered by both or all of the transceiver modules.

In some example implementations of the method of any preceding or any subsequent example implementation, or any combination thereof, electrically joining the one or more transceiver modules comprises electrically joining one or more transceiver modules at least some of which further has a processor configured to control the transceiver module or facilitate communications between two or more of the transceiver modules through the node core.

In some example implementations of the method of any preceding or any subsequent example implementation, or any combination thereof, the processor and logic are further configured to ignore, block or filter optical beams intended for an adjacent transceiver module joined to the node core, or modify its orientation, power level or frequency of its optical transceiver based on activity of the adjacent transceiver module.

In some example implementations of the method of any preceding or any subsequent example implementation, or any combination thereof, electrically joining the one or more transceiver modules comprises electrically joining one or more transceiver modules including a transceiver module with an optical transceiver configured to emit and detect optical beams carrying data, and another transceiver module with an electromagnetic wave transceiver configured to transmit and receive electromagnetic waves carrying data and in a band in the range of 1 megahertz (MHz) to 10 terahertz (THz).

In some example implementations of the method of any preceding or any subsequent example implementation, or any combination thereof, connecting the one or more transceiver modules comprises switchably connecting the one or more transceiver modules to support a mesh or mobile ad-hoc network topology of the optical communication network that includes the modular node and one or more other modular nodes with which the modular node is configured to communicate.

These and other features, aspects and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described the disclosure in the foregoing general terms, reference will now be made to the accompanying drawings, which are not necessarily drawn to scale, and wherein:

FIG. 8 illustrates an optical communication network that includes modular nodes in a mesh network topology;

Figure 11:
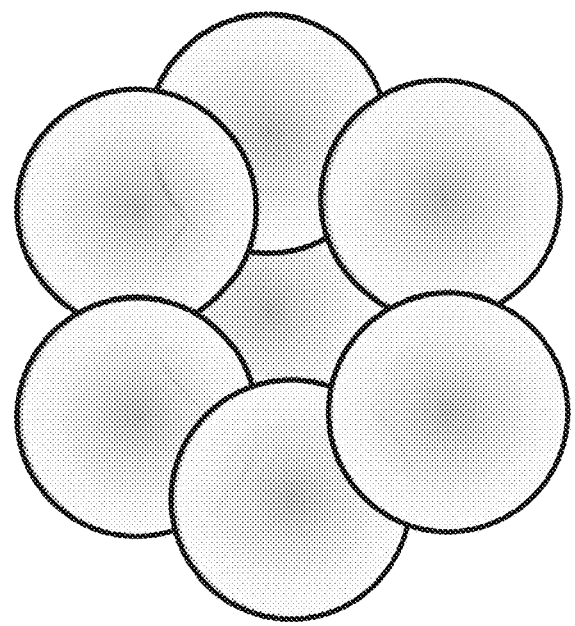
Figure 10:
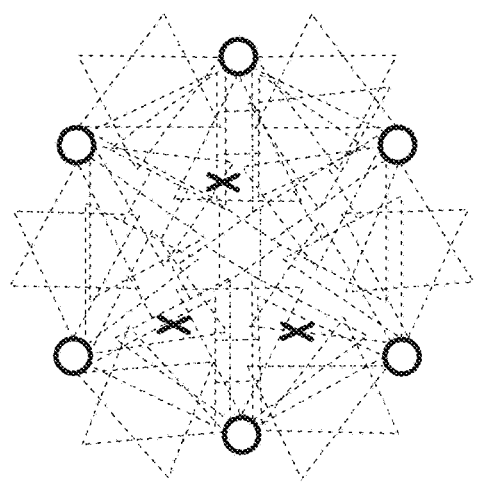
Figure 9:
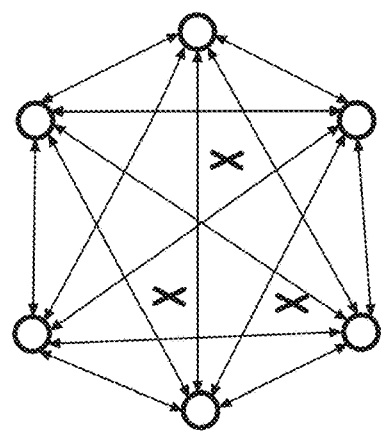
Figure 13:
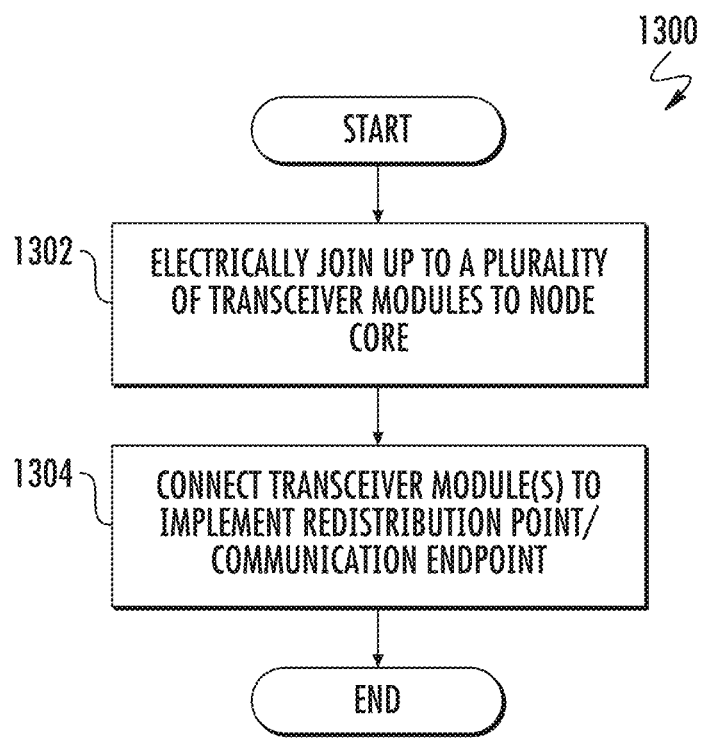

FIGS. 9, 10 and 11 compare a mesh network according to example implementations of the present disclosure with other optical and radio frequency networks;

FIG. 12 illustrates the mesh network of FIG. 8 in which modular nodes include different power or datarate panels, according to example implementations; and FIG. 13 is a flowchart including various operations in a method according to example implementations.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, for example, the singular forms "a," "an," "the" and the like include plural referents unless the context clearly dictates otherwise. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

As described hereinafter, example implementations of the present disclosure relate to optical communications, and more particularly diverged-beam optical communications. Example implementations of the present disclosure are primarily described in the context of free space optical (FSO) communications. It should be understood, however, that example implementations may be equally applicable in contexts other than that traditionally associated with FSO communications, that is, communications through air, outer space, vacuum or the like. For example, example implementations may be equally applicable to communications through water or any other liquid, solution or suspension, and any other matter or medium through which an optical beam may propagate without an optical fiber cable, waveguide or transmission line. These and other similar means of artificial confinement may present a contrast in index of refraction that leads to mode confinement therein to carry or otherwise guide an optical beam. Thus, example implementations may be more generally considered applicable to optical communications including the propagation of optical beams between a transmitter and a receiver without artificial confinement such as by optical fiber cable, waveguide, transmission line or the like.

As explained in greater detail below, example implementations of the present disclosure provide a high-power, modular, optical wireless communications node having up to a plurality of transceiver modules (often referred to as "panels") to provide omni-directional capability. The high-power, diverged beam system of the type proposed in the previously-cited and incorporated WO 2015/106110 and U.S. 2016/0294472 publications is here manifested as a single panel on node, with the composition of multiple panels on one node making the multi-directional node. The node is designed be modular (e.g., handle panels of different specifications depending on the application), support mobility, and, when in the presence of other nodes, function as a mesh network. The node will handle dynamic reconfiguration of the network as nodes move between panel coverage areas. Panels themselves can be of various power levels, various different emitter sources, various divergence and acceptance angles and of various modulation rates and schemes. When in an omni-directional configuration, the node covers an area leading to no angular tolerance issues, leads to lower cost solutions to the line of sight problem via inexpensive deployment of multiple nodes and redundancy in the mesh network, and addresses attenuation via high power and wide field-of-view receivers.

Figure 1:
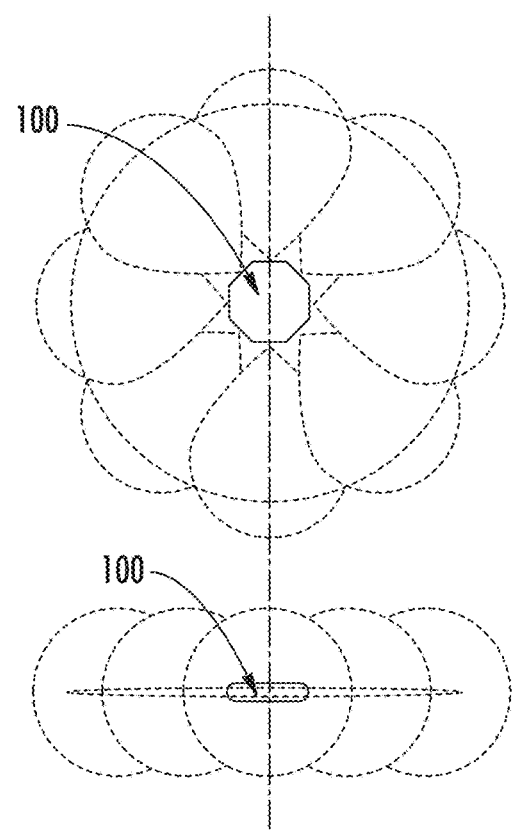
FIGS. 1 and 2 illustrate multi-directional nodes in various configurations according to various example implementations of the present disclosure.
Figure 2:
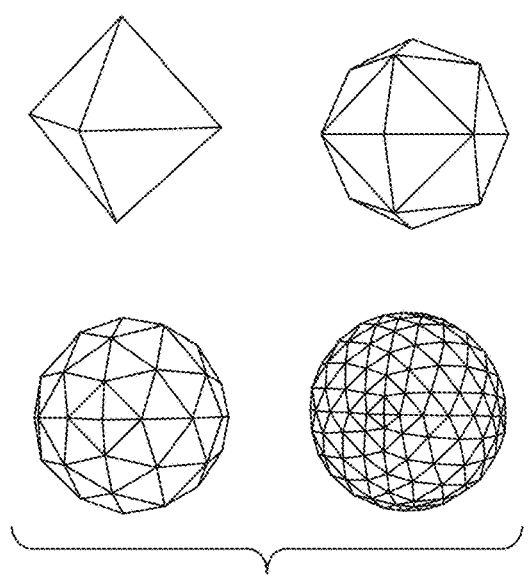

FIG. 1 illustrates a multi-directional node 100 in an omni-directional configuration with eight panels providing a 360 degree horizontal coverage, and a vertical angular range of 1's up to 10's of degrees. However, the node could be configured for any angular range from one panel up to hemispherical or fully spherical through minor mechanical changes easily known by those skilled in the art. FIG. 2 illustrates alternate implementations for full spherical coverage in which the face of each shape corresponds to a single panel. Cost efficiency will dictate the number of panels and thus the angular coverage area (receive and transmit) of each panel and thereby the node. Panel coverage areas can be larger in one dimension than another.

Other point to multi-point solutions require knowing ahead of time the number of connections a given point (or node) will have. Such solutions also need to know the direction of the connection, or require a device to have mechanical system to provide it a wide-range of orientation options. Example implementations provide for a node with enough flexibility so it can be used in most situations without modification of the node itself.

Alternative ways for addressing this spatial flexibility has been to create nodes which are inherently omni-directional. Providing such coverage statically drives up cost, which requires that designs often share components (optical, photonic, or electronic) to counter balance the increase. These systems are therefore cost prohibitive in case where a point-to-point or point-to-multipoint is required, and in an omni-configuration, do not provide the flexibility to vary the characteristics of the transceiver between different spatial areas.

Node and Panels

Figure 3:
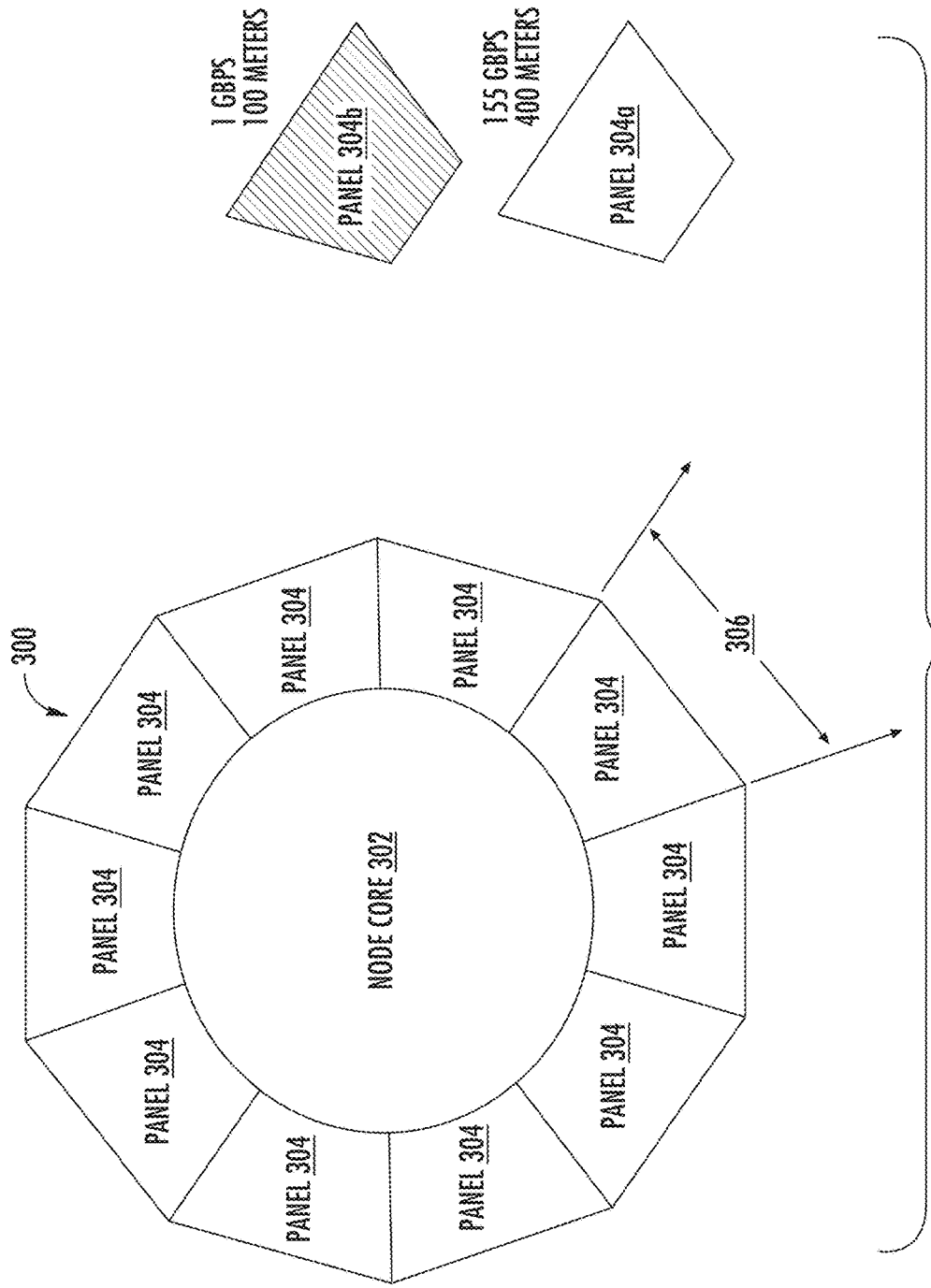
FIG. 3 illustrates a modular node, according to example implementations.
Figure 4:
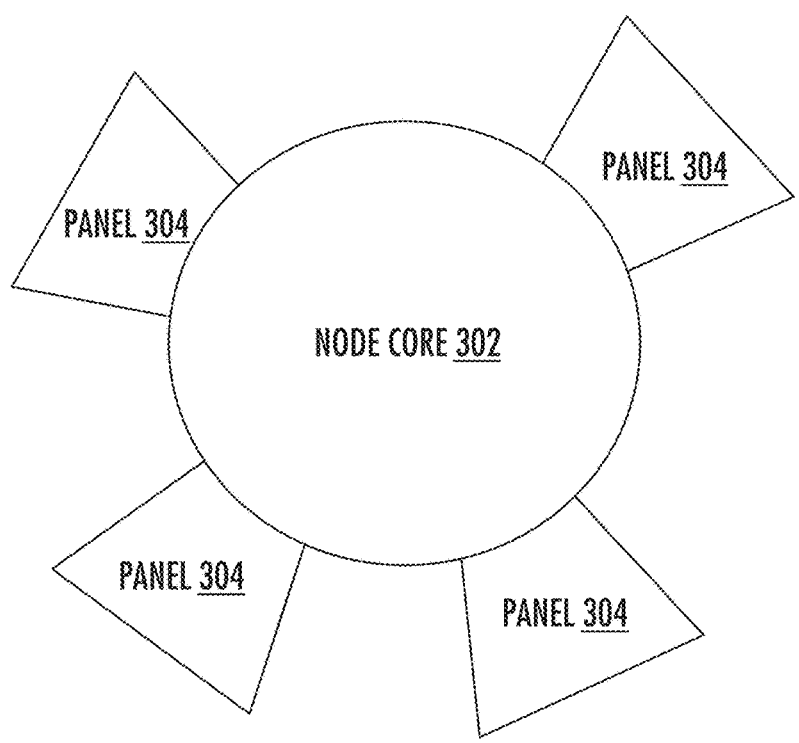
FIGS. 4, 5, 6 and 7 illustrate configurations of the modular node of FIG. 3 including different numbers, placement and connections of transceiver modules (also referred to as "panels"), according to example implementations.
Figure 5:
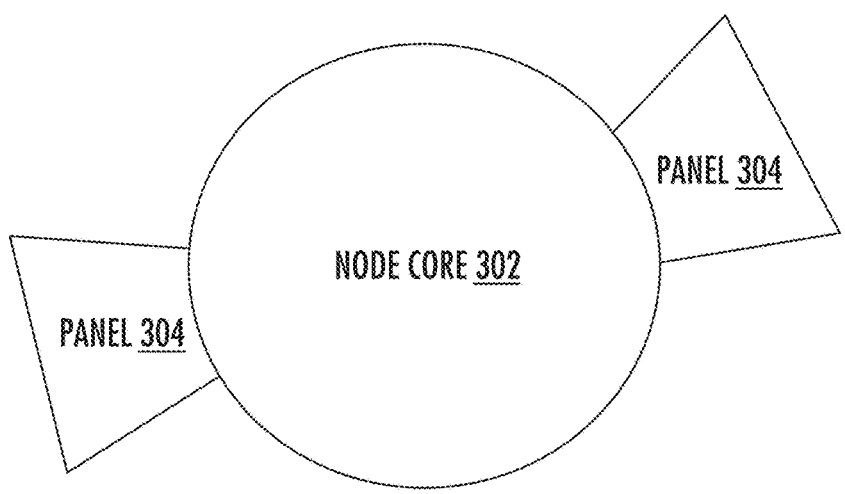

FIG. 3 illustrates a modular node 300 according to one example implementation of this disclosure. As shown, the node includes a node core 302 that can support a number of panels 304. The number of panels attached to a core may vary depending on the desired application or the particular performance or size of the panel required. The node has the capability to support panels of different specifications, two of which are also shown as panels 304a, 304b. The node also has the capability to support only a subset of panels as required. FIGS. 4 and 5 illustrate a node core with different numbers of panels. Fewer panels may address cost effectiveness in less dense areas, or enable the node to only implement a relay.

As also shown in FIG. 3, each panel 304 has a coverage area 306. Panels may be designed to have coverage areas that are distinct from each other or may overlap. In the case of an overlap, the node 300 or panel 304 electronics will dynamically select which panel is maintaining communication with the node or endpoint in the overlapping area.

Each panel 304 may have one or more panels of one or more other nodes 300 in its communication coverage area. In the case where there is more than one panel in a coverage area (i.e., one-to-many), panels have the ability to utilize time-division or wavelength division multiplexing to support active links to all the devices in that coverage area, whether this is achieved electronically or mechanically. Conversely, the panel that shares a coverage area with other panels (i.e., many-to-one) will also utilize time-division or wavelength division multiplexing if required by the other side of the link.

Nodes and panels may be stationary or mobile.

Panel Features

Panels 304 will necessarily have one or more transmitter devices and one or more photodetectors and a connection method back to the node. The specification of the panel in terms of coverage angles, datarate, and distance will dictate the balance of panel components and configurations. Panels may or may not need optical gain depending on the distance.

Panel connections could be a variety of methods known to those skilled in the art, including solid backplane connectors, high-speed versions of Ethernet, or perhaps even a low-noise-inducing wireless standard such as low-e Bluetooth.

Panel features may also include active tracking, whether through mechanical movement of the transceiver optical assembling, beam steering, or a liquid lens approach. Active tracking may also support a time-division multiplexing implementation through directed beams.

Panel functional coverage area distance may be adjusted, whether mechanically or with a liquid lens, to narrow but lengthen the coverage area for periods of time. Panels 304 are also capable of reducing power and thus reducing coverage area in instance when it may be advantageous to conserve power.

Panels 304 will have additional features to enable optimal performance with the node core 302 and with other panels also on the node, including (a) the ability to ignore, block or filter signal intended for an adjacent panel on the same node, (b) modify its orientation, power level, or frequency of its transceiver based on activity of an adjacent panel. In certain implementations it will be advantageous to have a processor and logic in the panel to achieve this, in other implementations this will be interpreted in the node core with instructions passed to the panel.

A processor on the panel 304 will be desirable in some cases to serve a control function on the individual panel. In other cases, the processor will facilitate communications between two or more panels through the node core 302. This panel/node core communication can be utilized to reduce latency of the switching within the node 300. A panel in conjunction with adjacent panels can utilize the changes in signal strength to allow the node core to anticipate when change may be occurring.

In this and other configurations, panels 304 are able to communicate through the node core 302 either to each other or to other devices on the network. In some cases, the panel will have knowledge of the network topology of the full network including panel configuration on the node. Communication by the panel can be used to change and/or optimize the network topology. The communication can also be used to report status on the characteristics of the link or the number and type of other panels in the field of view of that panel. These statistics may be communicated to a monitoring and control application, where the application is distributed to each node, or managed via a centralized or cloud-based server.

Node Core Features

The node core 302 contains mechanical interfaces to hold and connect panels 304 or panel connectors and the electronics facilitating communications of the panels and their various connections to other nodes. Mechanical interfaces can be any number greater than one, and may be only for a panel connector, such that the panel is positioned physically away from the node core and electronically connected via cable. The node core also supports a connection via a standard network connection (e.g., GigE Ethernet, radio frequency wireless, millimeter wireless, fiber, or other). The connection can be used to link a node to an existing network, to an endpoint, or to another wireless antenna designed to support multiple other endpoint connections.

Figure 6:
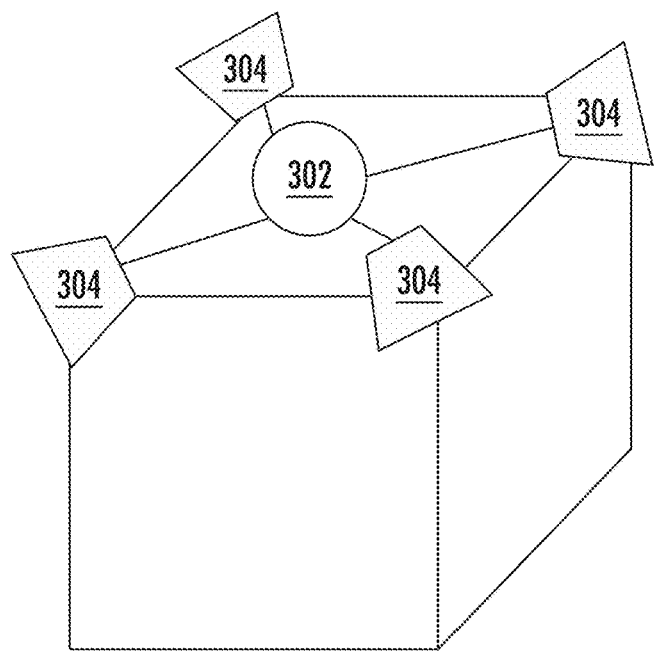
Figure 7:
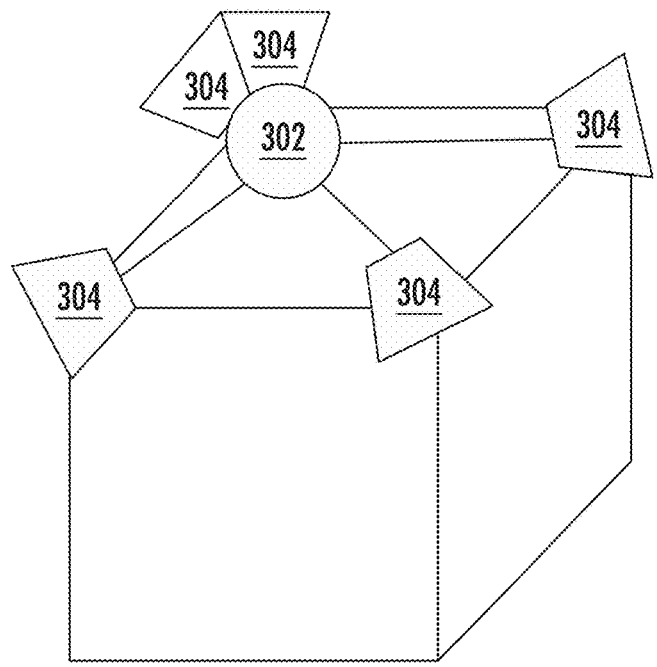

In some examples, the panels 304 will all be mechanically connected to the core. In such cases, the core mechanical connectors are configured to assure omni-directional coverage when all of the mechanical connectors are utilized. In other examples, such as in a rooftop implementations or others where core positioning confines the potential line-of-sight paths, panels may not be mechanical connected to the core and instead mounted separately away from the node, positioned to achieve optimal line-of-sight for each panel. This is shown in FIG. 6. In other examples, there will be panels both mechanically and not mechanically connected to a single node. This is shown in FIG. 7.

The node core 302 will also support panels 304 that utilize electromagnetic wave communications in the appropriate bands to support radio frequency (RF) communications, including millimeter wave, wireless LAN (e.g., Wi-Fi) and the like, terahertz (THz) communications, or others in the range of 1 megahertz (MHz) to 10 THz. The node core will have a standard interconnection such that non-communication devices such as panels supporting sensors or panels supporting metamaterials may also be utilized.

The node core 302 will have the capacity to also connect to one or more physical networks via fiber, Ethernet and/or other connection(s). The frequency of these types of node connections will depend on the optimal layout and reliability required for a given mesh network design.

Mesh Network

The node electronics (panel 304 or core 302 or some combination) support the dynamic reconfiguration of the network as nodes move through various panel coverage areas of the same node, or switch to coverage areas of a different node. FIG. 8 illustrates nodes 300 connected in a mesh network topology 800. The mesh network topology creates the benefit of redundancy and also higher overall network throughput. Each node may connect to an endpoint 802 via an optical connection 804 if the endpoint supports it, or via RF link 806, such as Wi-Fi or other standards. The dynamic reconfiguration may happen on a wide range of time scales. Existing protocols, such as IP, configure (and reconfigure) networks on time scales of seconds to minutes. This network may use those or similar protocol on those timescales. In addition, this network may configure and reconfigure itself on time scales from seconds down to microseconds. Minimum time scale is set by the packet size and the given datarate. High speed dynamic reconfiguration enables nodes to move and rotate on time scales from static to 1000 km's/hour.

Modular nodes 300 with optical wireless panels 304 will have particular advantages over other mesh implementations. For example, the number of spatially distinct coverage areas can be higher than with radio frequencies. A single node with panel transceivers having a divergence angle +/−0.5° could have 360 distinct coverage areas around the horizon. Taking a single transceiver having a throughput of 1 Gbps would create a node throughput of 360 Gbps in the horizontal plane only. Adding panels in the vertical direction increases the number of distinct coverage areas. Again as an example, covering 4 pi steradians with transceivers with a having a divergence angle of +/−0.5° would take up to about 44,000 panels.

The nodes 300 in a mesh network 800 may be stationary, mobile, or a combination of both. For example, a node implemented with a small form factor and panels 304 with a moderate power rating and moderate bitrate are suitable for using in connected passenger vehicles, connecting the vehicle to other modular nodes whether another vehicle or stationary node which is connected to a broader mesh network. In other cases the mobile node with have will be higher power and higher bit rates for use in public transportation vehicles such as buses or trains.

Also, as shown in FIG. 9, prior art narrow beam FSO nodal systems only allow point to point communications between the nodes. Other points, and moving users, are not able to receive or transmit communications. This is illustrated to be points "X" not being on a line of communication. The broad beams of example implementations cover all the areas in the mesh network, so that all points "X" are on communications beams, as shown in FIG. 10. Thus even moving users can be in continuous communication. Also, in comparison to omnidirectional radio frequency systems as shown in FIG. 11, example implementations of the present disclosure enable far higher bandwidths and frequency reuse. In addition to achieving linkage to any users in the entire mesh area, example implementations allow for high redundancy of coverage. As shown in FIG. 10, each user "X" can communicate with each of the six nodes, thereby increasing link reliability and bandwidth. In addition, multiple lasers and detectors on each panel can be incorporated so that each panel and each beam will continue to function even with multiple device failures. Lower cost lower reliability components can thus be used.

Switching

The node 300 performs switching of data to route it through the mesh network 800. These switching decisions can be made in panels 304 or in the node core 302. The node core may include an Ethernet switch with IP level switching determined by the switch utilizing any number of network topology and switching algorithms. In some cases, high speed switching decisions may be made by the panels and communicated to the node core. Alternately, the panels may transparently pass all link performance and control status data through to the node core where all switching decisions are made for a given node. Other configurations are possible. Even though Ethernet and IP have been used in this description, example implementations of the present disclosure are independent of data format and routing protocol.

In some cases, the panel 304 may anticipate switching changes for the node 300 in order to reduce latency. This will have particular impacts on implementations where a mesh node is mobile, for example, functioning as a communications device for a moving vehicle.

Mesh Networking Optimization with Modular Design

FIG. 12 illustrates a configuration in which it may be required or desired to have a higher power or higher datarate panels 304 at a given location on the mesh 600. In such cases, panels may be switched within the nodes to accommodate common path nodes where higher data rate 1002 or longer distance connections 1004 are desired. Such flexibility would be particularly useful in situations where the node is stationary.

In instances were mobility is desired, panels 304 can be designed to extend the range of the panel if it detects a fading connection (usually indicated by a node moving further away). In this case, the panel hardware can dynamically switch to a lower datarate modulation, increasing noise tolerance, and therefore extending the range.

Coarse Steering of Panels

Panels 304 within a node 300 may be enabled with coarse steering ability. This steering, in pan and tilt, provides the ability in a multi-directional, but not omni, configuration, to dynamically switch which panels are utilized to connect endpoints or other mesh nodes. This steering could be achieved mechanical or electronically utilizing optical phased arrays, liquid lenses or other methods.

FIG. 13 is a flowchart including various operations in a method 1300 of implementing a redistribution point or a communication endpoint in an optical communication network, according to example implementations. As shown at block 1302, the method includes electrically joining one or more up to a plurality of transceiver modules to a node core. At least some of the plurality of transceiver modules have an optical transceiver configured to emit optical beams carrying data and without artificial confinement, and detect optical beams emitted and without artificial confinement. The node core has a plurality of electrical connectors for electrically joining up to the plurality of transceiver modules, the up to the plurality of transceiver modules electrically joined to the node core being spatially separated to provide configurable coverage for optical communication based on their number and placement. And as shown at block 1304, the method includes connecting, by switching circuitry of the node core, the one or more transceiver modules to implement the redistribution point or the communication endpoint in the optical communication network.

Example implementations of the present disclosure may be implemented with any combination of hardware and software. If implemented as a computer-implemented apparatus, the examples may be implemented using means for performing some or all of the steps and functions described above.

Example implementations of the present disclosure can be included in an article of manufacture (e.g., one or more computer program products) having, for instance, a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium. The computer-readable storage medium has embodied therein, for instance, computer readable program code means, including computer-executable instructions, for providing and facilitating the mechanisms of example implementations. In this regard, the computer-readable storage medium may have computer-readable program code portions stored therein that, in response to execution by a processor (hardware processor), cause an apparatus to perform various functions described herein. The article of manufacture can be included as part of a computer system including the aforementioned processor, or provided separately. Or in some examples, the article of manufacture may be included in electronics of the node core 302 or panels 304 of the node 300.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A modular node for an optical communication network, the modular node comprising:
   two or more transceiver modules of a plurality of transceiver modules each of at least some of which with an optical transceiver configured to emit optical beams carrying data and without artificial confinement, and detect optical beams emitted and without artificial confinement; and
   a node core including a plurality of electrical connectors to electrically join up to the plurality of transceiver modules to the node core, the up to the plurality of transceiver modules electrically joined to the node core being spatially separated to provide configurable coverage for optical communication based on their number and placement,
   wherein the node core further includes switching circuitry configured to connect the two or more transceiver modules to implement a redistribution point or a communication endpoint in the optical communication network, and
   wherein the modular node is configured to perform switching of data to route the data through the optical communication network, and each transceiver module of the at least some of the two or more transceiver modules joined to the node core further has a processor configured to make switching decisions for the data passing through the transceiver module.

2. The modular node of claim 1, wherein the processor is configured to enable communications between at least some of the two or more of the transceiver modules through the node core.

3. The modular node of claim 1, wherein the processor is configured to make the switching decisions according to a configuration of the optical communication network, and to reconfigure the optical communication network, and wherein the optical communication network is reconfigurable within microseconds.

4. The modular node of claim 1, wherein the processor being configured to make switching decisions includes being configured to anticipate switching changes for the modular node.

5. The modular node of claim 1, wherein the processor being configured to make switching decisions includes being configured to make switching decisions based on information received from another of the two or more transceiver modules.

6. The modular node of claim 1, wherein the optical transceiver is configured to emit optical beams, and detect optical beams emitted, with a divergence angle of +/−0.5 degrees, and
   wherein the plurality of transceiver modules and plurality of electrical connectors includes respectively up to 44,000 transceiver modules and up to 44,000 connectors to provide up to 4 pi steradians of coverage when joined to the node core.

7. The modular node of claim 1, wherein the processor is further configured to report status on characteristics of an optical link with the transceiver module, or a number and type of other transceiver modules in a field of view of the transceiver module.

8. The modular node of claim 1, wherein the processor is configured to detect a fading connection with the transceiver module, and dynamically switch to a lower datarate modulation or increasing noise tolerance in response thereto.

9. The modular node of claim 1, wherein the modular node is mobile.

10. The modular node of claim 1, wherein the two or more transceiver modules include transceiver modules having respective fields of view that define an area covered by the transceiver modules when joined to the node core, the area having multiple dimensions one of which is larger than another.

11. The modular node of claim 1, wherein the optical transceiver includes a plurality of optical emitters.

12. The modular node of claim 1, wherein the optical transceiver includes a plurality of optical detectors.

13. The modular node of claim 1, wherein the processor is further configured to modify its power level or frequency of its optical transceiver based on activity of an adjacent transceiver module joined to the node core.

14. A system for an optical communication network, the system comprising a plurality of modular nodes, each modular node of the plurality of modular nodes comprising:

two or more transceiver modules of a plurality of transceiver modules each of at least some of which with an optical transceiver configured to emit optical beams carrying data and without artificial confinement, and detect optical beams emitted and without artificial confinement; and a node core including a plurality of electrical connectors to electrically join up to the plurality of transceiver modules to the node core, the up to the plurality of transceiver modules electrically joined to the node core being spatially separated to provide configurable coverage for optical communication based on their number and placement, wherein the node core further includes switching circuitry configured to connect the two or more transceiver modules to implement a redistribution point or a communication endpoint in the optical communication network, and wherein a transceiver module of the at least some of the two or more transceiver modules joined to the node core of one of the plurality of modular nodes further has a processor configured to enable communications with another transceiver module of another of the plurality of modular nodes.

15. The system of claim 14, wherein the switching circuitry being configured to connect the two or more transceiver modules includes being configured to switchably connect the two or more transceiver modules to support a mesh or mobile ad-hoc network topology of the optical communication network that includes the plurality of modular nodes, the processor of the transceiver module having information of the mesh or mobile ad-hoc network topology.

16. The system of claim 14, wherein the processor is further configured to enable communications between at least some of the two or more of the transceiver modules through the node core.

17. The system of claim 14, wherein each modular node is configured to perform switching of data to route the data through the optical communication network, and the processor is further configured to make switching decisions for the data passing through the transceiver module.

18. The system of claim 17, wherein the processor is configured to make the switching decisions according to a configuration of the optical communication network, and to reconfigure the optical communication network, and wherein the optical communication network is reconfigurable within microseconds.

19. The system of claim 17, wherein the processor being configured to make switching decisions includes being configured to anticipate switching changes for the modular node.

20. The system of claim 17, wherein the processor being configured to make switching decisions includes being configured to make switching decisions based on information received from another of the two or more transceiver modules.

* * * * *